United States Patent
Servin et al.

(10) Patent No.: US 10,634,809 B2
(45) Date of Patent: Apr. 28, 2020

(54) WATER CREST MONITORING USING ELECTROMAGNETIC TRANSMISSIONS

(71) Applicant: Saudi Arabian Oil Company, Dhahran (SA)

(72) Inventors: Jesus Manuel Felix Servin, Dhahran (SA); Howard Khan Schmidt, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 189 days.

(21) Appl. No.: 15/792,968

(22) Filed: Oct. 25, 2017

(65) Prior Publication Data

US 2019/0120994 A1    Apr. 25, 2019

(51) Int. Cl.
| | |
|---|---|
| *G01V 3/30* | (2006.01) |
| *G01V 11/00* | (2006.01) |
| *E21B 47/04* | (2012.01) |
| *G01V 3/34* | (2006.01) |
| *E21B 43/32* | (2006.01) |
| *E21B 49/00* | (2006.01) |

(52) U.S. Cl.
CPC ............ *G01V 3/30* (2013.01); *E21B 43/32* (2013.01); *E21B 47/042* (2013.01); *G01V 3/34* (2013.01); *G01V 11/002* (2013.01); *E21B 49/00* (2013.01)

(58) Field of Classification Search
CPC .......... G01V 3/30; G01V 3/34; G01V 11/002; E21B 43/32; E21B 47/042; E21B 49/00
See application file for complete search history.

(56) References Cited

U.S. PATENT DOCUMENTS

| | | |
|---|---|---|
| 3,286,163 A | 11/1966 | Holser et al. |
| 3,806,795 A | 4/1974 | Morey |
| 4,308,499 A | 12/1981 | Thierbach et al. |

(Continued)

OTHER PUBLICATIONS

Miorali, Mattia et al.; "Coupling ground penetrating radar and fluid flow modeling for oilfield monitoring applications" Geophysics, vol. 76, No. 3 (May-Jun. 2011); pp. A21-A25.

(Continued)

*Primary Examiner* — Patrick Assouad
*Assistant Examiner* — Feba Pothen
(74) *Attorney, Agent, or Firm* — Bracewell LLP; Constance G. Rhebergen; Christopher L. Drymalla

(57) ABSTRACT

Provided are systems and methods for monitoring water cresting in a subsurface formation. Embodiments include, for each of a plurality of locations along a length of a horizontal section of a wellbore extending into a hydrocarbon reservoir of a subsurface formation, advancing an omnidirectional electromagnetic logging tool (ODEMLT) to the location, operating the ODEMLT to transmit (into a portion of the subsurface formation below the horizontal section of the wellbore) an electromagnetic (EM) source signal comprising a multi-frequency waveform, operating the ODEMLT to sense an EM return signal comprising a reflection of the multi-frequency waveform from the subsurface formation, and generating a subset of saturation data for the location corresponding to the sensed EM return signal, and generating, based on the subsets of saturation data, a radargram including a two-dimensional mapping of water saturation within the portion of the subsurface formation.

17 Claims, 5 Drawing Sheets

(56) References Cited

U.S. PATENT DOCUMENTS

| | | | |
|---|---|---|---|
| 5,132,623 | A | 7/1992 | De et al. |
| 5,767,680 | A | 6/1998 | Torres-Verdin et al. |
| 6,188,221 | B1 | 2/2001 | Van De Kop et al. |
| 6,339,333 | B1 | 1/2002 | Kuo |
| 8,680,865 | B2 | 3/2014 | Zhang et al. |
| 9,158,026 | B2 | 10/2015 | Kesar et al. |
| 2007/0216416 | A1* | 9/2007 | Itskovich ............ G01V 3/28 324/339 |
| 2011/0227577 | A1 | 9/2011 | Zhang et al. |
| 2014/0297187 | A1 | 10/2014 | Miotti et al. |
| 2015/0233234 | A1 | 8/2015 | Jannin et al. |
| 2015/0362623 | A1 | 12/2015 | Miotti et al. |
| 2016/0003963 | A1 | 1/2016 | Kouchmeshky et al. |
| 2016/0313443 | A1 | 10/2016 | Al-Shuhail et al. |
| 2016/0363686 | A1 | 12/2016 | Kouchmeshky et al. |

OTHER PUBLICATIONS

Miorali, Mattia et al.; "Water front monitoring by ground penetrating radar technology" SEG Denver 2010 Annual Meeting; pp. 706-710.

International Search Report and Written Opinion for International PCT application PCT/US2018/057204 (SA5641) dated Feb. 6, 2019; pp. 1-12.

* cited by examiner

WATER CREST MONITORING USING ELECTROMAGNETIC TRANSMISSIONS

FIELD

Embodiments relate generally to assessment of subsurface formations and more particularly to systems and methods for monitoring water cresting in hydrocarbon reservoirs using electromagnetic (EM) transmissions.

BACKGROUND

Petroleum exploration and production emphasizes optimizing production of hydrocarbons from subsurface hydrocarbon reservoirs. This can include drilling wells into reservoirs to extract hydrocarbons from the reservoirs, such as oil and gas trapped in the reservoirs. In some instances, enhanced oil recovery (EOR) techniques are employed to aid in the extraction of hydrocarbons from reservoirs. Common EOR techniques include water injection, thermal injection, gas injection, and chemical injection. During an injection operation, a substance is typically injected into a reservoir by way of one or more injection wells, and the pressure and flow of the injected substance urges the hydrocarbons to flow toward productions wells.

Techniques for optimizing reservoir production often rely on accurate assessments of reservoirs, including monitoring the locations of hydrocarbons and other substances as they move through a reservoir. For example, it can be desirable to track the progression of water as it migrates through a reservoir to determine if and when water will reach a production well. In the case of horizontal wells, the term "water cresting" or "water coning" refers to an anomalous rise of a water level above a normal oil-water contact level. When viewed from its profile, the "crest" or "cone" of water may appear as an upward-arcing pocket of water that extends from a region of the reservoir saturated with water, into a hydrocarbon rich area of the reservoir. A horizontally oriented wellbore of a horizontal well may extend into the hydrocarbon rich area to provide a path for the extraction of the hydrocarbons from the reservoir. Unfortunately, if the water crest reaches the wellbore, the water can be drawn into the wellbore, reducing the hydrocarbon production from the well.

SUMMARY

Applicants have recognized that accurate and complete saturation data can be imperative to monitoring the movement of water in reservoirs and taking proactive measures to prevent or delay water cresting. For example, if fluid saturation data provides an accurate indication that water cresting is occurring near a wellbore, a well operator can take appropriate actions to inhibit the water cresting, such as adjusting a production rate, modifying stimulation operations, and/or the like. Applicants have also recognized that existing techniques for predicting water-breakthrough into a wellbore have several shortcomings. For example, current logging tools, such as saturation and production logging tools, can provide saturation data for portions of a reservoir very near to a wellbore (e.g., the portion of a reservoir within a meter of the wellbore), but they provide little to no information about the deeper portions of the reservoir (e.g., a meter or more away from the wellbore). Existing techniques often rely on data interpolation to generate saturation maps for the deeper portions of the reservoir. Although the interpolations can provide some insight into saturation of the reservoir at extended distances from a wellbore, they have an inherently high level of uncertainty. Thus, existing techniques may not enable reservoir engineers to confidently design and implement proactive measures to inhibit water cresting. Moreover, certain existing techniques rely on complex tools and processing to investigate the region surrounding a wellbore, such as tools that require rotation within the wellbore, the generation and processing of modulated signals having different frequencies, and/or conducting a frequency sweep acquisition. Unfortunately, these complexities can increase the time and cost for assessment of a reservoir. For example, these complexities can lead to additional costs associated with the complex tooling itself, as well as increases in time and costs associated with acquiring and processing the data suing the tooling.

Recognizing these and other shortcomings of existing techniques for assessing hydrocarbon reservoirs, Applicants have developed novel techniques for monitoring water cresting in the vicinity of a horizontally oriented section of a wellbore. In some embodiments, an omnidirectional electromagnetic (EM) logging tool is employed to assess water saturation within an extended distance of a horizontally oriented section of a wellbore of a hydrocarbon well. For example, an omnidirectional EM logging tool can be operated to acquire saturation data for a horizontal section of a wellbore of a hydrocarbon production well extending into a reservoir, a two-dimensional saturation mapping (or "radargram") of a portion of the reservoir located below the horizontal section of the wellbore can be generated using the acquired saturation data, water cresting in the vicinity of the horizontal section of the wellbore can be identified from features of the saturation mapping, and operations to inhibit the water cresting can be planned and conducted based on the identification of the water cresting.

The omnidirectional EM logging tool can include an omnidirectional transmitter (Tx) and an omnidirectional receiver (Rx). In some embodiments, the omnidirectional transmitter is an omnidirectional broadband transmitter capable of transmitting a waveform containing multiple frequencies. For example, the omnidirectional transmitter may include a multi-frequency broadband EM transmitter capable of transmitting a waveform containing multiple frequencies across a frequency range of about 0.1 to 100 MHz (megahertz). In some embodiments, the omnidirectional transmitter is operated to generate alternating current (AC) EM pulses having a center frequency in the rage of about 0.5 to 50 MHz. For example, the omnidirectional transmitter may be operated to generate AC EM pulses centered at a frequency of about 35 MHz.

In some embodiments, the omnidirectional receiver is an omnidirectional broadband receiver capable of sensing a waveform containing multiple frequencies. For example, the omnidirectional receiver may include a multi-frequency broadband EM receiver capable of sensing a waveform containing multiple frequencies across a frequency range of about 0.1 to 100 MHz (megahertz). In some embodiments, the omnidirectional receiver is operated to sense signal reflections across a given duration of time (or "time window"). The duration of time may be in the range of about 20 to 500 nanoseconds (ns). For example, if the omnidirectional transmitter is operated to generate broadband AC EM pulses centered at a frequency of about 35 MHz at a given signal generation time, the omnidirectional receiver may be operated to sense signal reflections across a 300 ns time window following the signal generation time. The sensed signal reflections may correspond to portions of the generated EM signals that are reflected back from the reservoir due to variances in reservoir characteristics, such as changes in impedance in the reservoir. Changes in impedance may be attributable to transitions in fluid saturation or lithology in the reservoir, such as differences in impedance between rock mainly saturated with oil (an "oil zone"), rock saturated with a mixture of oil and water (a "transition zone"), and rock mainly saturated with water (a "water zone"). This can include, for example, an impedance contrast of oil saturated rock proximate a wellbore and brine saturated rock at or near an oil-water contact level deep in the reservoir, an extended distance from the wellbore. In some embodiments, the sensed signals include multi-frequency waveforms that correspond to the different frequencies of the transmitted waveform (e.g., including the broadband AC EM pulses). As a result, a Fast Fourier Transform (FFT) can be applied to the multi-frequency waveforms to analyze the response at multiple frequencies, and the different frequencies can be assessed without having to perform a frequency sweep acquisition.

In some embodiments, a saturation mapping operation includes advancing the omnidirectional EM logging tool along a horizontal section of a wellbore to acquire saturation data for multiple locations (or "stations") along the section. For example, the omnidirectional EM logging tool may be lowered to a first location in a horizontal section of a wellbore of a well, be operated to conduct a first saturation measurement sequence to acquire a first set of saturation measurements for the first location, be advanced along the wellbore to a second location in the horizontal section, be operated to conduct a second saturation measurement sequence to acquire a second set of saturation measurements for the second location, and so forth to acquire sets of saturation data for each of the locations of interest along the horizontal section of the wellbore. If for example, there are 48 locations of interest along the horizontal section of the wellbore, the omnidirectional EM logging tool can be advanced to each of the locations of interest, and the omnidirectional EM logging tool can be operated to conduct one or more saturation measurement sequences at each of the locations of interest.

In some embodiments, each saturation measurement sequence includes the transmitter transmitting EM signals and the omnidirectional receiver sensing corresponding reflections of the EM signals. For example, a saturation measurement sequence may include the omnidirectional transmitter being operated to generate broadband AC EM pulses centered at about 35 MHz at a signal generation time, and the omnidirectional receiver being operated to sense corresponding signals (including signal reflections corresponding to the generated broadband AC EM pulses) across a 300 ns time window following the signal generation time.

In some embodiments, the acquired saturation data is used to generate a saturation mapping (or "radargram") for a portion (or length) of the horizontal section of the wellbore. For example, the set of saturation data for each of the locations of interest can be used to determine signal velocities, the signal velocities can be used to determine various electromagnetic properties of the reservoir (e.g., electrical conductivity ($\sigma$), magnetic permeability ($\mu$), and electric permittivity ($\epsilon$)) as a function of distance from the location, and the electromagnetic properties can be used to determine saturation values of the reservoir as a function of distance from the location. The determined saturation values for each of the locations can be plotted together to generate a two-dimensional radargram that includes (or otherwise indicates) saturation values for a two-dimensional portion of the reservoir located below the horizontal section of the wellbore. In some embodiments, the saturation values are used to determine the profile of an oil-water contact boundary and the boundaries of an oil zone, a transition zone and/or a water zone. In such an embodiment, the radargram can include a two-dimensional mapping of the oil-water contact boundary, the oil zone, the transition zone and/or the water zone below the horizontal section of the wellbore. In some embodiments, the saturation mapping is used to as a basis for planning and conducting well operations to inhibit water cresting to the wellbore of the well. For example, if a water cresting is identified in a radargram, a well operator can conduct well operations to inhibit the water cresting.

In some embodiments, a saturation mapping operation is repeated over time to generate a time-lapse saturation mapping (or a "time-lapse radargram") that further emphasizes changes in saturation of the reservoir over time. Such a time-lapse saturation mapping can provide an easy to decipher representation of the migration of water in the reservoir, including any water cresting. For example, a first saturation mapping operation of a horizontal section of a wellbore may be conducted to generate a first (or "baseline") radargram, and subsequent saturation mapping operations of the horizontal section of the wellbore may be conducted over time (e.g., weekly, monthly, or annually) to generate corresponding radargrams that can be viewed in sequence to identify if and how water is migrating within the reservoir, including any water cresting in the vicinity of the horizontal section of the wellbore. In some embodiments, the baseline radargram is subtracted from subsequent radargrams to remove noise and emphasize the changes in saturation relative to the baseline radargram, over time.

The proposed embodiments can provide several advantages over existing techniques for monitoring movement of water in reservoirs and taking proactive measures to prevent or delay water cresting. For example, embodiments can provide accurate measures of saturation deep into a reservoir (e.g., several meters or even tens of meters or more from a wellbore, depending on reservoir conditions), thereby providing for more through, accurate and reliable saturation mappings for deeper portions of a reservoir. As a result, the proposed embodiments enable reservoir engineers to confidently design and implement proactive measures to inhibit water cresting. Moreover, embodiments can employ an omnidirectional EM logging tool that remains stationary during a measurement sequence (e.g., the omnidirectional EM logging tool is not rotated during a measurement sequence) and that is capable of generating and sensing a single broadband signal (e.g., the omnidirectional EM logging tool does not require modulation of signals having different frequencies, or require a frequency sweep to sense the signals of different frequencies, during a measurement sequence). As a result, the tool, its operation and the corresponding processing can be simplified, which can save time and cost. For example, a measurement sequence that includes simply generating and receiving a broadband EM signal in a given position and orientation (without rotation) may be relatively short in duration in comparison to a measurement sequence of other techniques that require rotating a tool (or even a portion of a tool) about a wellbore to acquire data at different orientations in the wellbore and/or the generation and sweep sensing of multiple modulated signals having different frequencies. Accordingly, the proposed embodiments can provide for relatively thorough and accurate saturation mappings, which can be completed in a relatively short timeframe and a cost effective manner.

Provided in some embodiments is a method for monitoring water cresting in a subsurface formation. The method including: conducting a saturation data acquisition operation including, for each of a plurality of locations along a length of a horizontal section of a wellbore extending into a hydrocarbon reservoir of a subsurface formation: advancing an omnidirectional electromagnetic logging tool (ODEMLT) to the location (the ODEMLT including an omnidirectional transmitter (ODTx) adapted to transmit electromagnetic (EM) source signals including multi-frequency waveforms and an omnidirectional receiver (ODRx) adapted to sense EM return signals including reflections of the multi-frequency waveforms transmitted by the ODTx); operating the ODTx to transmit, into a portion of the subsurface formation below the horizontal section of the wellbore, an EM source signal including a multi-frequency waveform; operating the ODRx to sense an EM return signal including a reflection of the multi-frequency waveform from the subsurface formation; and generating a subset of saturation data for the location corresponding to the sensed EM return signal; and generating, based on the subsets of saturation data for the plurality of locations along the length of the horizontal section of the wellbore, a radargram including a two-dimensional mapping of water saturation within a portion of the subsurface formation below the length of the horizontal section of the wellbore.

In some embodiments, the method further includes the following: conducting, at a first time, a first saturation data acquisition operation including, for each of the plurality of locations along the length of the horizontal section of the wellbore extending into the hydrocarbon reservoir of the subsurface formation: advancing the ODEMLT to the location; operating the ODTx to transmit, into the portion of the subsurface formation below the horizontal section of the wellbore, an EM source signal including a multi-frequency waveform; operating the ODRx to sense an EM return signal including a reflection of the multi-frequency waveform from the subsurface formation; and generating a first subset of saturation data for the location corresponding to the sensed EM return signal; and generating, based on the first subsets of saturation data for the plurality of locations along the length of the horizontal section of the wellbore, a first radargram including a two-dimensional mapping of water saturation within the portion of the subsurface formation below the length of the horizontal section of the wellbore at the first time. In certain embodiments, the method further includes generating a time-lapse radargram including the radargram and the first radargram. In some embodiments, the saturation data acquisition operation is conducted at a second time that is subsequent to the first time, the radargram is an enhanced radargram, and generating the enhanced radargram includes subtracting the first radargram from the radargram generated based on the subsets of saturation data for the plurality of locations along the length of the horizontal section of the wellbore.

In some embodiments, the method further includes conducting, at a third time that is subsequent to the second time, a third saturation data acquisition operation including, for each of the plurality of locations along the length of the horizontal section of the wellbore extending into the hydrocarbon reservoir of the subsurface formation: advancing the ODEMLT to the location; operating the ODTx to transmit, into the portion of the subsurface formation below the horizontal section of the wellbore, an EM source signal including a multi-frequency waveform; operating the ODRx to sense an EM return signal including a reflection of the multi-frequency waveform from the subsurface formation; and generating a third subset of saturation data for the location corresponding to the sensed EM return signal; and generating, based on the third subsets of saturation data for the plurality of locations along the length of the horizontal section of the wellbore, a third radargram including a two-dimensional mapping of water saturation within a portion of the subsurface formation below the length of the horizontal section of the wellbore at the third time, where the third radargram is a second enhanced radargram, and where generating the second enhanced radargram includes subtracting the first radargram from the radargram generated based on the third subsets of saturation data for the plurality of locations along the length of the horizontal section of the wellbore. In certain embodiments, the method further includes generating an enhanced time-lapse radargram including the enhanced radargram and the second enhanced radargram.

In some embodiments, the ODTx includes a first omnidirectional antenna and the ODRx includes one or more second omnidirectional antennas. In certain embodiments, the saturation data acquisition operation for each of the locations includes the ODTx and the ODRx remaining stationary in a given orientation at the location. In some embodiments, the radargram includes an upward-arc feature corresponding to the water crest, and where identifying the water crest includes identifying a height of the upward-arc feature exceeding a height threshold.

In some embodiments, the method further includes the following: identifying, based on the radargram, a water crest including a cresting of water toward the horizontal section of the wellbore; and, in response to identifying the water crest, conducting an operation to inhibit migration of the water crest toward the horizontal section of the wellbore. In certain embodiments, the operation to inhibit migration of the water crest toward the horizontal section of the wellbore includes one or more of the following: modifying a production rate of the well to inhibit migration of the water crest toward the horizontal section of the wellbore; and modifying a rate of water injection into the reservoir to inhibit migration of the water crest toward the horizontal section of the wellbore.

Provided in some embodiments is a system for monitoring water cresting in a subsurface formation. The system including: an omnidirectional electromagnetic logging tool (ODEMLT) (including: an omnidirectional transmitter (ODTx) adapted to transmit electromagnetic (EM) source signals including multi-frequency waveforms; and an omnidirectional receiver (ODRx) adapted to sense EM return signals including reflections of the multi-frequency waveforms transmitted by the ODTx); and a well surface system adapted to perform the following operations: for each of a plurality of locations along a length of a horizontal section of a wellbore extending into a hydrocarbon reservoir of a subsurface formation: advancing the ODEMLT to the location; operating the ODTx to transmit, into a portion of the subsurface formation below the horizontal section of the wellbore, an EM source signal including a multi-frequency waveform; operating the ODRx to sense an EM return signal including a reflection of the multi-frequency waveform from the subsurface formation; and generating a subset of saturation data for the location corresponding to the sensed EM return signal; and generating, based on the subsets of saturation data for the plurality of locations along the length of the horizontal section of the wellbore, a radargram including a two-dimensional mapping of water saturation within a portion of the subsurface formation below the length of the horizontal section of the wellbore.

In some embodiments, the operations further include: conducting, at a first time, a first saturation data acquisition operation including, for each of the plurality of locations along the length of the horizontal section of the wellbore extending into the hydrocarbon reservoir of the subsurface formation: advancing the ODEMLT to the location; operating the ODTx to transmit, into the portion of the subsurface formation below the horizontal section of the wellbore, an EM source signal including a multi-frequency waveform; operating the ODRx to sense an EM return signal including a reflection of the multi-frequency waveform from the subsurface formation; and generating a first subset of saturation data for the location corresponding to the sensed EM return signal; and generating, based on the first subsets of saturation data for the plurality of locations along the length of the horizontal section of the wellbore, a first radargram including a two-dimensional mapping of water saturation within the portion of the subsurface formation below the length of the horizontal section of the wellbore at the first time. In certain embodiments, the operations further include generating a time-lapse radargram including the radargram and the first radargram. In some embodiments, the saturation data acquisition operation is conducted at a second time that is subsequent to the first time, where the radargram is an enhanced radargram, and where generating the enhanced radargram includes subtracting the first radargram from the radargram generated based on the subsets of saturation data for the plurality of locations along the length of the horizontal section of the wellbore.

In some embodiments, the operations further include: conducting, at a third time that is subsequent to the second time, a third saturation data acquisition operation including, for each of the plurality of locations along the length of the horizontal section of the wellbore extending into the hydrocarbon reservoir of the subsurface formation: advancing the ODEMLT to the location; operating the ODTx to transmit, into the portion of the subsurface formation below the horizontal section of the wellbore, an EM source signal including a multi-frequency waveform; operating the ODRx to sense an EM return signal including a reflection of the multi-frequency waveform from the subsurface formation; and generating a third subset of saturation data for the location corresponding to the sensed EM return signal; and generating, based on the third subsets of saturation data for the plurality of locations along the length of the horizontal section of the wellbore, a third radargram including a two-dimensional mapping of water saturation within a portion of the subsurface formation below the length of the horizontal section of the wellbore at the third time, where the third radargram is a second enhanced radargram, and where generating the second enhanced radargram includes subtracting the first radargram from the radargram generated based on the third subsets of saturation data for the plurality of locations along the length of the horizontal section of the wellbore. In certain embodiments, the operations further include generating an enhanced time-lapse radargram including the enhanced radargram and the second enhanced radargram.

In some embodiments, the ODTx includes a first omnidirectional antenna and the ODRx includes one or more second omnidirectional antennas. In certain embodiments, the saturation data acquisition operation for each of the locations includes the ODTx and the ODRx remaining stationary in a given orientation at the location. In some embodiments, the radargram includes an upward-arc feature corresponding to the water crest, and where identifying the water crest includes identifying a height of the upward-arc feature exceeding a height threshold.

In some embodiments, the operations further include: identifying, based on the radargram, a water crest including a cresting of water toward the horizontal section of the wellbore; and, in response to identifying the water crest, conducting an operation to inhibit migration of the water crest toward the horizontal section of the wellbore. In certain embodiments, the operation to inhibit migration of the water crest toward the horizontal section of the wellbore includes one or more of the following: modifying a production rate of the well to inhibit migration of the water crest toward the horizontal section of the wellbore; and modifying a rate of water injection into the reservoir to inhibit migration of the water crest toward the horizontal section of the wellbore.

Provided in some embodiments is a non-transitory computer readable medium including program instructions stored thereon that are executable to perform operations for monitoring water cresting in a subsurface formation. The operations including: conducting a saturation data acquisition operation including, for each of a plurality of locations along a length of a horizontal section of a wellbore extending into a hydrocarbon reservoir of a subsurface formation: advancing an omnidirectional electromagnetic logging tool (ODEMLT) to the location (the ODEMLT including an omnidirectional transmitter (ODTx) adapted to transmit electromagnetic (EM) source signals including multi-frequency waveforms and an omnidirectional receiver (ODRx) adapted to sense EM return signals including reflections of the multi-frequency waveforms transmitted by the ODTx); operating the ODTx to transmit, into a portion of the subsurface formation below the horizontal section of the wellbore, an EM source signal including a multi-frequency waveform; operating the ODRx to sense an EM return signal including a reflection of the multi-frequency waveform from the subsurface formation; and generating a subset of saturation data for the location corresponding to the sensed EM return signal; and generating, based on the subsets of saturation data for the plurality of locations along the length of the horizontal section of the wellbore, a radargram including a two-dimensional mapping of water saturation within a portion of the subsurface formation below the length of the horizontal section of the wellbore.

Figure 1:
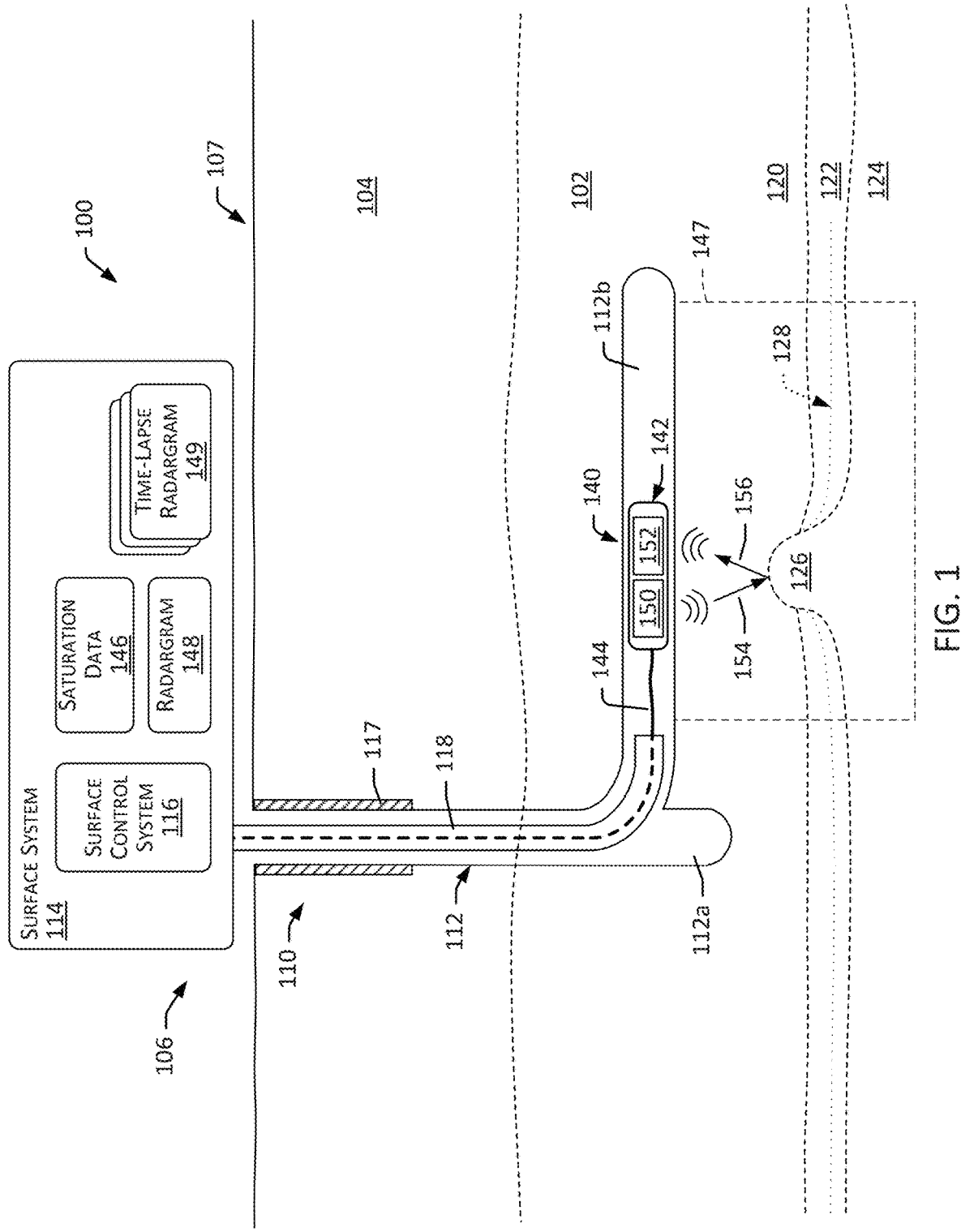
FIG. 1 is a diagram that illustrates a well environment in accordance with one or more embodiments.

While this disclosure is susceptible to various modifications and alternative forms, specific embodiments are shown by way of example in the drawings and are described in detail. The drawings may not be to scale. It should be understood that the drawings and the detailed descriptions are not intended to limit the disclosure to the particular form disclosed, but are intended to disclose modifications, equivalents, and alternatives falling within the spirit and scope of the present disclosure as defined by the claims.

DETAILED DESCRIPTION

Described are embodiments of systems and methods for monitoring water cresting in the vicinity of a horizontally oriented section of a wellbore of a hydrocarbon well. In some embodiments, an omnidirectional electromagnetic (EM) logging tool is employed to assess water saturation within an extended distance of a horizontally oriented section of a wellbore of a hydrocarbon well. For example, an omnidirectional EM logging tool can be operated to acquire saturation data for a horizontal section of a wellbore of a hydrocarbon production well extending into a reservoir, a two-dimensional saturation mapping (or "radargram") of a portion of the reservoir located below the horizontal section of the wellbore can be generated using the acquired saturation data, water cresting in the vicinity of the horizontal section of the wellbore can be identified from features of the saturation mapping, and operations to inhibit the water cresting can be planned and conducted based on the identification of the water cresting.

The omnidirectional EM logging tool can include an omnidirectional transmitter (Tx) and an omnidirectional receiver (Rx). In some embodiments, the omnidirectional transmitter is an omnidirectional broadband transmitter capable of transmitting a waveform containing multiple frequencies. For example, the omnidirectional transmitter may include a multi-frequency broadband EM transmitter capable of transmitting a waveform containing multiple frequencies across a frequency range of about 0.1 to 100 MHz (megahertz). In some embodiments, the omnidirectional transmitter is operated to generate alternating current (AC) EM pulses having a center frequency in the rage of about 0.5 to 50 MHz. For example, the omnidirectional transmitter may be operated to generate AC EM pulses centered at a frequency of about 35 MHz.

In some embodiments, the omnidirectional receiver is an omnidirectional broadband receiver capable of sensing a waveform containing multiple frequencies. For example, the omnidirectional receiver may include a multi-frequency broadband EM receiver capable of sensing a waveform containing multiple frequencies across a frequency range of about 0.1 to 100 MHz (megahertz). In some embodiments, the omnidirectional receiver is operated to sense signal reflections across a given duration of time (or "time window"). The duration of time may be in the range of about 20 to 500 nanoseconds (ns). For example, if the omnidirectional transmitter is operated to generate broadband AC EM pulses centered at a frequency of about 35 MHz at a given signal generation time, the omnidirectional receiver may be operated to sense signal reflections across a 300 ns time window following the signal generation time. The sensed signal reflections may correspond to portions of the generated EM signals that are reflected back from the reservoir due to variances in reservoir characteristics, such as changes in impedance in the reservoir. Changes in impedance may be attributable to transitions in fluid saturation or lithology in the reservoir, such as differences in impedance between rock mainly saturated with oil (an "oil zone"), rock saturated with a mixture of oil and water (a "transition zone"), and rock mainly saturated with water (a "water zone"). This can include, for example, an impedance contrast of oil saturated rock proximate a wellbore and brine saturated rock at or near an oil-water contact level deep in the reservoir, an extended distance from the wellbore. In some embodiments, the sensed signals include multi-frequency waveforms that correspond to the different frequencies of the transmitted waveform (e.g., including the broadband AC EM pulses). As a result, a Fast Fourier Transform (FFT) can be applied to the multi-frequency waveforms to analyze the response at multiple frequencies, and the different frequencies can be assessed without having to perform a frequency sweep acquisition.

In some embodiments, a saturation mapping operation includes advancing the omnidirectional EM logging tool along a horizontal section of a wellbore to acquire saturation data for multiple locations (or "stations") along the section. For example, the omnidirectional EM logging tool may be lowered to a first location in a horizontal section of a wellbore of a well, be operated to conduct a first saturation measurement sequence to acquire a first set of saturation measurements for the first location, be advanced along the wellbore to a second location in the horizontal section, be operated to conduct a second saturation measurement sequence to acquire a second set of saturation measurements for the second location, and so forth to acquire sets of saturation data for each of the locations of interest along the horizontal section of the wellbore. If for example, there are 48 locations of interest along the horizontal section of the wellbore, the omnidirectional EM logging tool can be advanced to each of the locations of interest, and the omnidirectional EM logging tool can be operated to conduct one or more saturation measurement sequences at each of the locations of interest.

In some embodiments, each saturation measurement sequence includes the transmitter transmitting EM signals and the omnidirectional receiver sensing corresponding reflections of the EM signals. For example, a saturation measurement sequence may include the omnidirectional transmitter being operated to generate broadband AC EM pulses centered at about 35 MHz at a signal generation time, and the omnidirectional receiver being operated to sense corresponding signals (including signal reflections corresponding to the generated broadband AC EM pulses) across a 300 ns time window following the signal generation time.

In some embodiments, the acquired saturation data is used to generate a saturation mapping (or "radargram") for a portion (or length) of the horizontal section of the wellbore. For example, the set of saturation data for each of the locations of interest can be used to determine signal velocities, the signal velocities can be used to determine various electromagnetic properties of the reservoir (e.g., electrical conductivity ($\sigma$), magnetic permeability ($\mu$), and electric permittivity ($\epsilon$)) as a function of distance from the location, and the electromagnetic properties can be used to determine saturation values of the reservoir as a function of distance from the location. The determined saturation values for each of the locations can be plotted together to generate a two-dimensional radargram that includes (or otherwise indicates) saturation values for a two-dimensional portion of the reservoir located below the horizontal section of the wellbore. In some embodiments, the saturation values are used to determine the profile of an oil-water contact boundary and the boundaries of an oil zone, a transition zone and/or a water zone. In such an embodiment, the radargram can include a two-dimensional mapping of the oil-water contact boundary, the oil zone, the transition zone and/or the water zone below the horizontal section of the wellbore. In some embodiments, the saturation mapping is used to as a basis for planning and conducting well operations to inhibit water cresting to the wellbore of the well. For example, if a water cresting is identified in a radargram, a well operator can conduct well operations to inhibit the water cresting.

In some embodiments, a saturation mapping operation is repeated over time to generate a time-lapse saturation mapping (or a "time-lapse radargram") that further emphasizes changes in saturation of the reservoir over time. Such a time-lapse saturation mapping can provide an easy to decipher representation of the migration of water in the reservoir, including any water cresting. For example, a first saturation mapping operation of a horizontal section of a wellbore may be conducted to generate a first (or "baseline") radargram, and subsequent saturation mapping operations of the horizontal section of the wellbore may be conducted over time (e.g., weekly, monthly, or annually) to generate corresponding radargrams that can be viewed in sequence to identify if and how water is migrating within the reservoir, including any water cresting in the vicinity of the horizontal section of the wellbore. In some embodiments, the baseline radargram is subtracted from subsequent radargrams to remove noise and emphasize the changes in saturation relative to the baseline radargram, over time.

FIG. 1 is diagram that illustrates a well environment 100 in accordance with one or more embodiments. In the illustrated embodiment, the well environment 100 includes a hydrocarbon reservoir (a "reservoir") 102 located in a subsurface formation (a "formation") 104, and a well system 106.

The formation 104 may include a porous or fractured rock formation that resides underground, beneath the earth's surface 107. The reservoir 102 may include a portion of the formation 104 that contains (or is at least determined to contain or expected to contain) a subsurface pool of hydrocarbons, such as oil and gas. The reservoir 102 may include different layers of rock having varying characteristics, such as varying degrees of permeability, porosity, and resistivity. In the case of the well system 106 being operated as a production well, the well system 106 may facilitate the extraction (or "production") of hydrocarbons from the reservoir 102. In the case of the well system 106 being operated as an injection well, the well system 106 may facilitate the injection of fluids, such as water, into the reservoir 102. In the case of the well system 106 being operated as a monitoring well, the well 106 may facilitate the monitoring of various characteristics of the reservoir 102, such water saturation.

The well system 106 can include a well 110 (defined by a wellbore 112 that extends downward from the earth's surface 107, into the formation 104 and/or the reservoir 102) and a surface system 114. The surface system 114 can include components for operating the well 110, such as a surface control system 116 for monitoring and controlling operations of drilling, completion and/or production of the well 110. The surface control system 116 can include hoists, engines, valves, pumps, sensors, and/or computer controllers for controlling the various operations. In some embodiments, the surface control system 116 includes a computer system that is the same as or similar to that of computer system 1000 described with regard to at least FIG. 4.

The wellbore 112 may include a mother-bore and one or more lateral bores. In the illustrated embodiment, the wellbore 112 includes a vertically-oriented mother-bore 112a and a single, horizontally-oriented lateral-bore (or "horizontal section") 112b. The horizontal section 112b may be defined by a portion of the wellbore 112 that runs generally parallel to the Earth surface 107 (e.g., having an orientation in the range of about +/−30% to horizontal). A well including such a horizontal section 112b may be referred to as a "horizontal well". The well 110 can also include completion components, such as casing 117 lining walls of the wellbore 112 and/or production tubing 118 disposed in the wellbore 112. The casing 117 can include, for example, tubular sections of steel pipe lining portions of an inside diameter of the wellbore 112 to provide structural integrity to the wellbore 112. Cement can be disposed between the outside of the casing and the walls of the wellbore 112, or between adjacent sections of casings, to improve the structural integrity of the wellbore 112. The portions of the wellbore 112 having casing 117 installed may be referred to as "cased" portions of the wellbore 112. The portions of the wellbore 112 not having casing installed may be referred to as "un-cased" or "open-holed" portions of the wellbore 112. For example, the upper portion of the mother-bore 112a having casing 117 installed may be referred to as a cased portion of the wellbore 112, and the lower portion of the wellbore 112 below (or "down-hole" from) the lower end of the casing 117 may be referred to as the un-cased (or open-holed) portion of the wellbore 112. In some embodiments, some or all of the horizontal section 112b may be un-cased. The production tubing 118 can include hollow tubing disposed in the wellbore 112 that provides a conduit for the flow production fluids, including oil and gas, up the wellbore 112, to the surface system 114.

The reservoir 102 can include different zones, such as an oil zone 120, a transition zone 122 and/or a water zone 124. The oil zone 120 can include a portion of the reservoir 102 having formation rock mainly saturated with oil (e.g., having an oil saturation $S_o$ of about 1.0, $S_o \approx 1.0$). The transition zone 122 can include a portion of the reservoir 102 having formation rock with a mixture of oil and water (e.g., having an oil saturation $S_o$ of about 0.5 and a water saturation $S_w$ of about 0.5, $S_o \approx 0.5$ and $S_w \approx 0.5$). The water zone 124 can include a portion of the reservoir 102 having formation rock mainly saturated with water (e.g., having a water saturation $S_w$ of about 1.0, $S_w \approx 1.0$). An oil-water contact boundary 128 can be defined as a surface or boundary above which primarily oil resides (e.g., above which an oil saturation $S_o$ is greater than about 0.5 and a water saturation $S_w$ is less than about 0.5).

In some instances, the oil-water contact boundary 128 includes a "crest" or "cone" 126 that encroaches into the oil zone 120, toward the wellbore 112. The crest 126 may be, for example, a pocket of water that has migrated upward, encroaching into the oil zone 120. If the migration of the water forming the crest 126 is not mitigated, the crest 126 can continue to migrate into the oil zone 120, and eventually reach the wellbore 122. If the crest 126 reaches the wellbore 112, the water forming the crest 126 may enter the wellbore 112, resulting in the water being produced with hydrocarbons drawn in from the reservoir 102 by way of other portions of the wellbore 112. Such an encroachment of water into the wellbore 112 can adversely affect the ability of the well system 106 to produce hydrocarbons, such as oil and gas. In some instances, a crest 126 may manifest itself as a hump (or upward-arc) in the oil-water contact boundary 128. For example, in the illustrated embodiment, the crest 126 includes a hump in the oil-water contact boundary 128 that extends into the oil zone 120. In some instances, such a crest can be caused by elevated water injection operation pressures that effectively push the water into and through relatively low pressure regions of the oil zone 120, and/or by relatively low formation pressures in the oil zone 120 that allow the water to migrate into the oil zone 120.

In some embodiments, the well system 106 includes a ground penetrating radar (GPR) system 140. The GPR system may be capable of sensing the location and migration of the oil-water contact boundary 128, and any associated cresting of the water zone 124. In some embodiments, the ground penetrating radar system 140 includes an omnidirectional EM logging tool (ODEMLT) 142, a system for conveying the ODEMLT 142 down-hole (such as coiled tubing 144), and a system for processing saturation data acquired using the ODEMLT 142 (such as the surface control system 116). As described, in some embodiments, the ODEMLT 142 is employed to assess water saturation within an extended distance of the wellbore 112. For example, the ODEMLT 142 can be positioned in the horizontal section 112b of the wellbore 112, the ODEMLT 142 can be advanced and operated to acquire saturation data 146 for the horizontal section 112b of the wellbore 112, a two-dimensional saturation mapping (or "radargram") 148 of a portion of the reservoir 102 located below the horizontal section 112b of the wellbore 112 (e.g., represented by the bounding box 147) can be generated using the acquired saturation data 146, the water crest 126 in the vicinity of the horizontal section 112b of the wellbore 112 can be identified from features of the radargram 148, and operations to inhibit the water cresting can be planned and conducted based on the identification of the water crest 126.

In some embodiments, the ODEMLT 142 includes an omnidirectional transmitter (OD Tx) 150 and an omnidirectional receiver (ODRx) 152. The ODTx 150 may include an omnidirectional antenna operated to transmit EM source signals 154 into the reservoir 102, and the ODRx 152 may include one or more omnidirectional antenna operated to sense EM return signals 156 that correspond reflections of the transmitted EM source signals 154 of features of the reservoir 102. In some embodiments, the ODTx 150 is an omnidirectional broadband transmitter capable of transmitting a waveform containing multiple frequencies. For example, the ODTx 150 may include a multi-frequency broadband EM transmitter antenna capable of transmitting EM source signals 154 including a waveform containing multiple frequencies across a frequency range of about 0.1 to 100 MHz (megahertz). In some embodiments, the ODTx 150 is operated to generate EM source signals 154 including alternating current (AC) EM pulses having a center frequency in the range of about 0.5 to 50 MHz. For example, the ODTx 150 may be operated to generate EM source signals 154 including AC EM pulses centered at a frequency of about 35 MHz.

In some embodiments, the ODRx 152 is an omnidirectional broadband receiver capable of sensing a waveform containing multiple frequencies. For example, the ODRx 152 may include a multi-frequency broadband EM receiver antenna capable of sensing EM return signals 156 including a waveform containing multiple frequencies across a frequency range of about 0.1 to 100 MHz (megahertz). In some embodiments, the ODRx 152 is operated to sense EM return signals 156 including signal reflections across a given duration of time (or "time window"). The duration of time may be in the range of about 20 to 500 nanoseconds (ns). For example, if the ODTx 150 is operated to generate EM source signals 154 including broadband AC EM pulses centered at a frequency of about 35 MHz at a given signal generation time, the ODRx 152 may be operated to sense EM return signals 156 including signal reflections across a 300 ns time window following the signal generation time. The sensed EM return signals 156 may include signal reflections that correspond to portions of the generated EM source signals 154 (including the broadband AC EM pulses) that are reflected back from the reservoir 102 due to variances in characteristics of the reservoir 102, such as changes in impedance in the reservoir 102. Changes in impedance may be attributable to transitions in fluid saturation or lithology in the reservoir 102, such as differences in impedance between rock of the oil zone 120 (mainly saturated with oil), rock of the transition zone 122 (saturated with a mixture of oil and water), and rock of the water zone 124 (mainly saturated with water). This can include, for example, an impedance contrast of oil saturated rock proximate the horizontal section 112b of the wellbore 112 and brine saturated rock at or near the oil-water contact boundary 128 located deep in the reservoir 102, an extended distance (e.g., more than 1 m) from the horizontal section 112b of the wellbore 112. In some embodiments, the sensed EM return signals 156 include multi-frequency waveforms that correspond to the multiple frequencies of the transmitted waveform (e.g., including the broadband AC EM pulses) of the EM source signals 154. A Fast Fourier Transform (FFT) may be applied to the multi-frequency waveforms (e.g., by the surface control system 116) to analyze the response at multiple frequencies, without having to perform a frequency sweep acquisition.

In some embodiments, a saturation mapping operation includes advancing the ODEMLT 142 along the horizontal section 112b of the wellbore 112 to acquire saturation data 146 for multiple locations (or "stations") along the horizontal section 112b of the wellbore 112. For example, the ODEMLT 142 may be lowered into the wellbore 112 to a first location in a the horizontal section 112b of the wellbore 112, be operated to conduct a first saturation measurement sequence to acquire a first set of saturation measurements for the first location, be advanced along the wellbore 112 to a second location in the horizontal section 112b of the wellbore 112, be operated to conduct a second saturation measurement sequence to acquire a second set of saturation measurements for the second location, and so forth, to acquire subsets of saturation data 146 for each of the locations of interest along the horizontal section 112b of the wellbore 112. In some embodiments, the locations may be located at a given interval. For example, the locations may be located every 1 m for 48 m along a portion of the horizontal section 112b of the wellbore 112. If for example, there are 48 locations of interest (or "stations") along the horizontal section 112b, the ODEMLT 142 can be advanced to each of the stations, and the ODEMLT 142 can be operated to conduct one or more saturation measurement sequences at each of the stations to generate a corresponding subsets of the saturation data 146 for each of the 49 stations.

In some embodiments, each saturation measurement sequence includes the ODTx 150 transmitting EM source signals 154 and the ODRx 152 sensing EM return signals 156 corresponding to reflections of the EM source signals 154. For example, a saturation measurement sequence may include operating the ODTx 150 to generate EM source signals 154 including broadband AC EM pulses centered at a frequency of about 35 MHz at a given signal generation time, and operating the ODRx 152 to sense EM return signals 156 (including signal reflections corresponding to the generated broadband AC EM pulses) across a 300 ns time window following the signal generation time. In some embodiments, the ODEMLT 142 remains stationary at an orientation (e.g., it is not rotated) during a saturation measurement sequence (or sequences) at a given location. For example, the ODEMLT 142 may be moved into a first station with the ODTx 150 and the ODRx 152 in a first orientation, one or more measurement sequences can be conducted at the first station with the ODTx 150 and the ODRx 152 remaining in the first orientation (e.g., not rotating), the ODEMLT 142 may be moved to a second station with the ODTx 150 and the ODRx 152 in a second orientation that is the same as or different from the first orientation, one or more measurement sequences can be conducted at the second station with the ODTx 150 and the ODRx 152 remaining in the second orientation (e.g., not rotating), and so forth. The ODEMLT 142 may or may not be rotated as it is moved between stations. The omnidirectional nature of the ODTx 150 and the ODRx 152 may enable them to operate independent of orientation, thereby eliminating a need to rotate the ODTx 150 and the ODRx 152 into a particular orientation (or through different orientations) for measurement sequences at the stations.

In some embodiments, the acquired saturation data 146 is used to generate a saturation mapping (or "radargram") 148 for the horizontal section 112*b* of the wellbore 112. For example, the subset of saturation data 146 for each of the locations of interest can be used to determine signal velocities for the reservoir rock in the vicinity of the location, the signal velocities can be used to determine various electromagnetic properties of the reservoir (e.g., electrical conductivity ($\sigma$), magnetic permeability ($\mu$), and electric permittivity ($\epsilon$)) in the vicinity of the location as a function of distance from the location, and the electromagnetic properties can be used to determine saturation values of the reservoir 102 in the vicinity of the location as a function of distance from the location. The determined saturation values for each of the locations can be plotted together to generate a two-dimensional radargram 148 that includes (or otherwise indicates) saturation values for a two-dimensional portion of the reservoir 102 located below the horizontal section 112*b* of the wellbore 112. In some embodiments, the saturation values are used to determine a profile of the oil-water contact boundary 128, and/or boundaries of the oil zone 120, the transition zone 122 and/or the water zone 124 below the horizontal section 112*b* of the wellbore 112. In such an embodiment, the radargram 148 can include a two-dimensional mapping (or other indication) of the profile of the oil-water contact boundary 128, and/or boundaries of the oil zone 120, the transition zone 122 and/or the water zone 124 below the horizontal section 112*b* of the wellbore 112. In some embodiments, the radargram 148 is used to as a basis for planning and conducting well operations to inhibit water cresting to the wellbore 112 of the well. For example, if the water crest 126 is identified in the radargram 148, a well operator can conduct well operations to inhibit the water crest 126.

In some embodiments, saturation mapping operations can be repeated over time to generate a time-lapse saturation mapping (or a "time-lapse radargram") 149 that further emphasizes changes in saturation of the reservoir 102, over time. Such a time-lapse saturation mapping 149 may provide an easy to decipher representation of the migration of water in the reservoir 102, including water cresting 126 defined by migration and/or cresting of the oil-water contact boundary 128, the upper boundary of the water zone 124 and/or the upper boundary of the transition zone 122 in the vicinity of the horizontal section 112*b* of the wellbore 112. For example, a first saturation mapping operation of the horizontal section 112*b* of the wellbore 112 may be conducted to generate a first (or "baseline") radargram 148, and subsequent saturation mapping operations of the same horizontal section 112*b* of the wellbore 112 may be conducted over time (e.g., weekly, monthly or annually) to generate corresponding radargrams 148 that can be viewed in sequence to identify if and how water is migrating within the reservoir 102, including water cresting 126 defined by migration and/or cresting of the oil-water contact boundary 128, the upper boundary of the water zone 124 and/or the upper boundary of the transition zone 122 in the vicinity of the horizontal section 112*b* of the wellbore 112. In some embodiments, the baseline radargram 148 is subtracted from subsequent radargrams 148 to remove noise and emphasize the changes in saturation relative to the baseline, over time. For example, a first ("baseline") radargram 148 acquired at a first week may be subtracted from subsequent second, third, fourth and fifth radargrams 148 from the second, third, fourth fifth weeks following the first week. The radargrams 148 resulting from the subtraction may be referred to as "enhanced" radargrams 148.

Figure 2A:
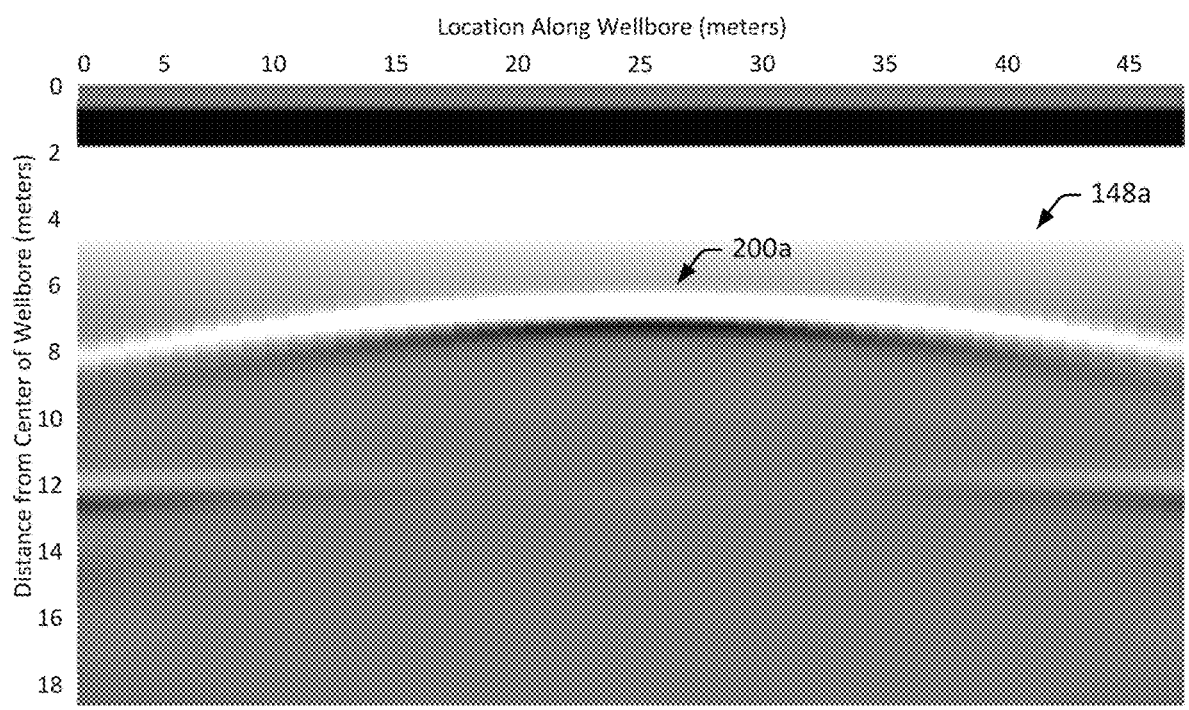
FIGS. 2A-2D are diagrams that illustrate radargrams in accordance with one or more embodiments.
Figure 2B:
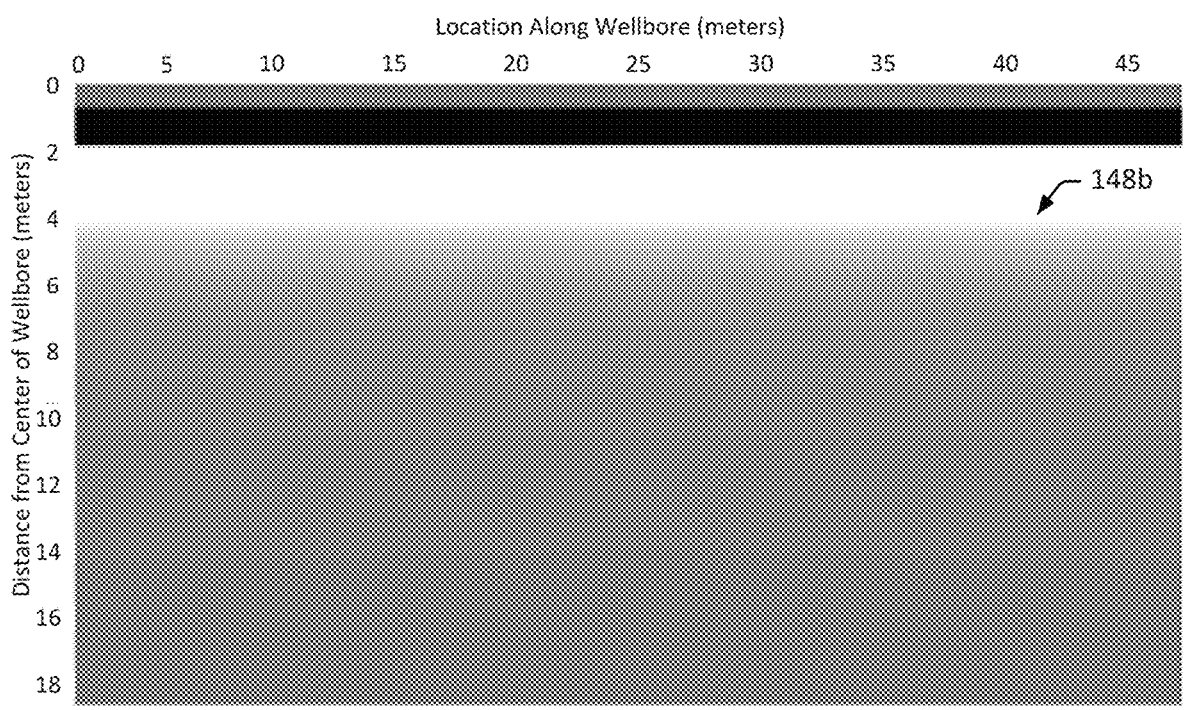
Figure 2C:
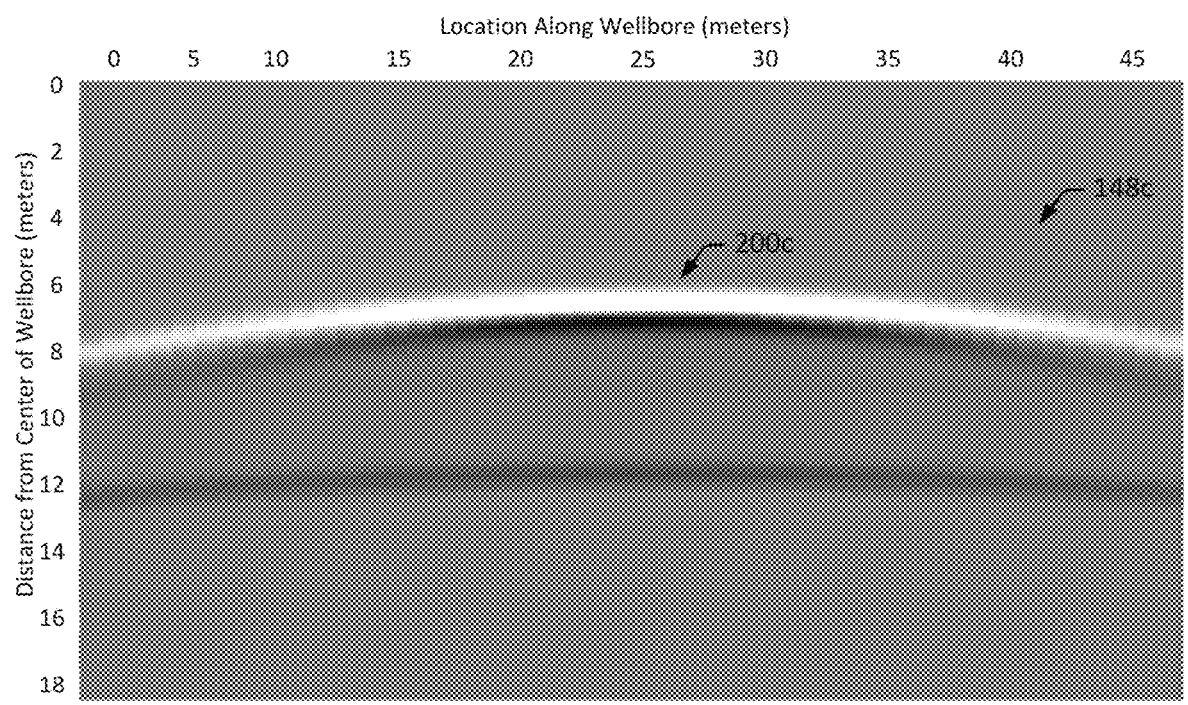
Figure 2D:
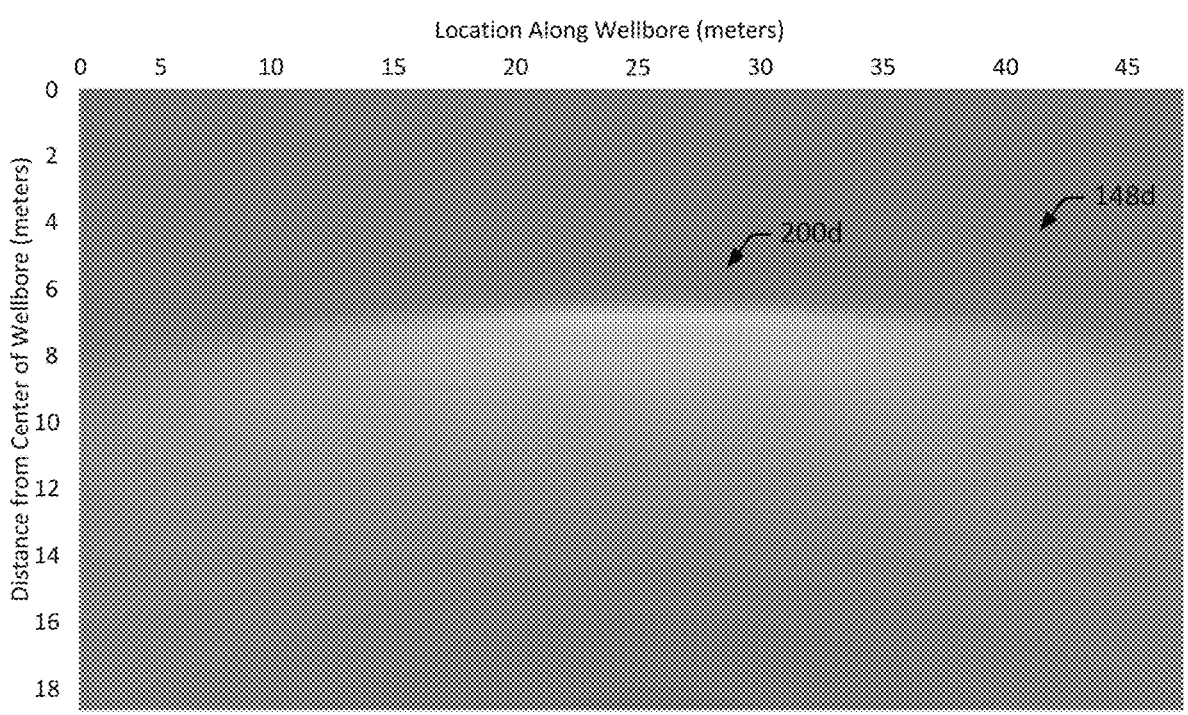

FIGS. 2A-2D are diagrams that illustrate radargrams in accordance with one or more embodiments. The diagrams illustrate the ability of the proposed embodiments to provide a clear, visible indications of water cresting in a reservoir, even in instances where salinity is relatively high. Each of the radargrams include a two-dimensional image with each pixel being associated with a particular location and having value (or shade) representing a respective saturation level at the location (e.g., the darker pixels representing relatively high water saturation values and the lighter pixels representing relatively high oil saturation values). FIG. 2A is diagram that illustrates a radargram 148*a* of water cresting in a water zone having a relatively low salinity of 10 thousand parts-per-million (kppm) total dissolved solids (TDS). The radargram 148*a* includes a readily apparent upward-arc feature 200*a* that is indicative a water crest that is encroaching on an oil zone proximate a wellbore (represented by the dark line at the top of the radargram 148*a*). FIG. 2B is diagram that illustrates a radargram 148*b* of water cresting in a water zone having a relatively high salinity of 60 kppm TDS. Despite there actually being a water crest that is encroaching on an oil zone in the portion of the reservoir represented by the radargram 148*b*, due to the high relatively high salinity, the radargram 148*b* does not include any visible features that are indicative of the water crest. FIG. 2C is diagram that illustrates a radargram 148*c* of water cresting in the water zone having a relatively low salinity of 10 kppm TDS. The radargram 148*c* is an enhanced radargram, generated via subtraction of a baseline radargram 148 from the radargram 148*a* of FIG. 2A. Notably, the radargram 148*c* includes a readily apparent upward-arc feature 200*c* that is indicative the water crest that is encroaching on the oil zone. The visible upward-arc feature 200*c* is even more clear and apparent than the corresponding upward-arc feature 200*a* of the radargram 148*a* of FIG. 2A. FIG. 2D is diagram that illustrates a radargram 148*d* of water cresting in the water zone having a relatively high salinity of 60 kppm TDS. The radargram 148*d* is an enhanced radargram, generated via subtraction of a baseline radargram 148 from the radargram 148*b* of FIG. 2B. Notably, the radargram 148*d* includes a readily apparent upward-arc feature 200*d* that is indicative of the water crest that is encroaching on the oil zone. Indeed, the visible upward-arc feature 200*d* is more apparent than in the radargram 148*b* of FIG. 2B. Thus, it is evident that the proposed time-lapse and subtraction techniques can provide enhanced radargrams 148 that can provide a more clear and accurate representation of water location and migration in a reservoir, including water cresting.

Figure 3:
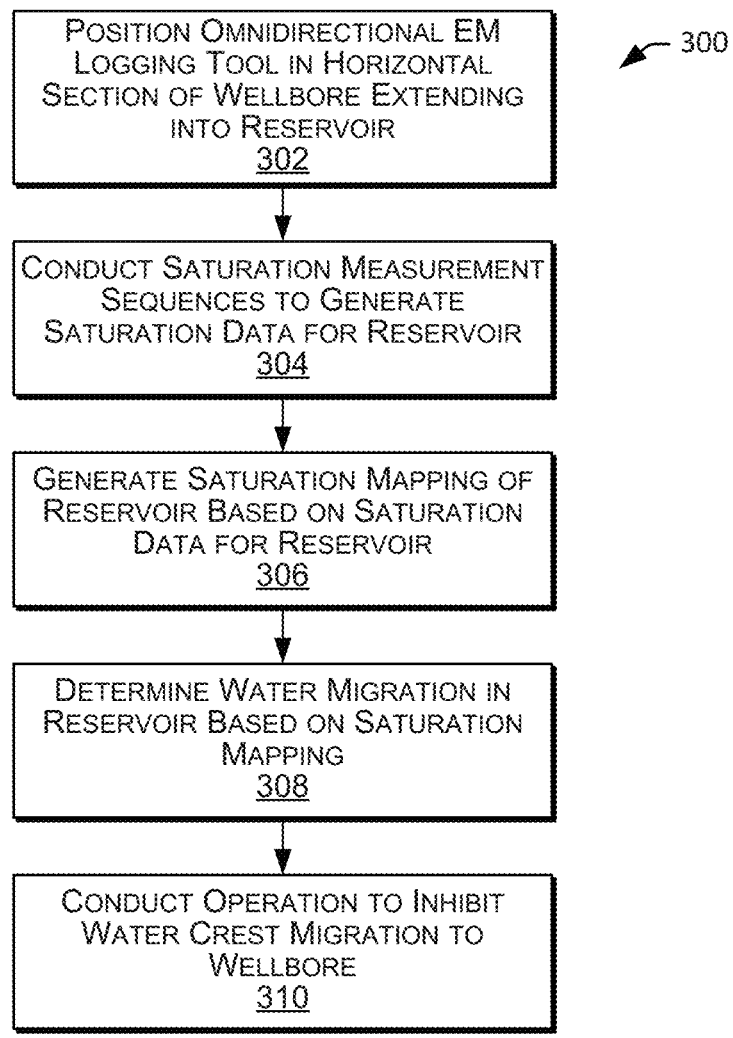
FIG. 3 is a flowchart that illustrates a method of monitoring water cresting in accordance with one or more embodiments.

FIG. 3 is a flowchart that illustrates a method 300 of operating a well to inhibit water cresting to a wellbore of a well in accordance with one or more embodiments. Method 300 can include positioning an omnidirectional EM logging tool in a horizontal section of a wellbore extending into a reservoir (block 302), conducting saturation measurement sequences to generate saturation data for the reservoir (block 304), generating a saturation mapping of the reservoir based on the saturation data for the reservoir (block 306), determining water migration within the reservoir based on the saturation mapping (block 308), and conducting an operation to inhibit water cresting to the wellbore (block 310).

In some embodiments, positioning an omnidirectional EM logging tool in a horizontal section of a wellbore extending into a reservoir (block 302) includes positioning an ODEMLT in a first location (or "station") in a horizontal section of a wellbore extending into a reservoir. For example, positioning an omnidirectional EM logging tool in a horizontal section of a wellbore extending into a reservoir can include a well operator employing the surface control system 116 to lower the ODEMLT 142 through the motherbore 112a and to a first location (or "station") in the horizontal portion 112b of the wellbore 112. The first location may be associated with a location of 0 meters based on it being a first location. In some embodiments, the ODEMLT 142 is lowered through the production tubing 118. The ODEMLT 142 may be physically and communicatively coupled to the surface system 114 by way of the coiled tubing 144 that extends from the surface system 114 to the ODEMLT 142.

In some embodiments, conducting saturation measurement sequences to generate saturation data for the reservoir (block 304) includes operating an ODEMLT to conduct saturation measurement sequences at a plurality of different locations along a length of a horizontal section of a wellbore extending into a reservoir, to generate corresponding saturation data for a portion of the reservoir located below the horizontal section of the wellbore. For example, if a saturation mapping operation for the wellbore 112 includes 49 locations of interest (or "stations") located every 1 m along a 48 m portion of the horizontal section 112b of the wellbore 112, then conducting saturation measurement sequences to generate saturation data for the reservoir 102 can include the surface control system 116 operating the ODEMLT 142 to conduct a first saturation measurement sequence to acquire a first set of saturation measurements for the first location (at a location of 0 m), controlling the surface system 114 to advance the ODEMLT 142 along the wellbore 112 to a second location 1 m down the horizontal section 112b of the wellbore 112, from the first location, operating the ODEMLT 142 to conduct a second saturation measurement sequence to acquire a second set of saturation measurements for the second location, and so forth to acquire a subset of the saturation data 146 for each of the 49 locations of interest along the 48 m of the horizontal section 112b of the wellbore 112. The saturation data 146 for the reservoir 102 and the wellbore 112 may include each of the respective subset of saturation data 146 generated by the 49 measurements sequences conducted every 1 m, from 0 m to 48 m in the horizontal section 112b of the wellbore 112.

In some embodiments, each saturation measurement sequence includes an ODTx of the ODEMLT transmitting EM source signals and a ODRx of the ODEMLT sensing EM return signals corresponding to reflections of the EM source signals. Continuing with the above example, each saturation measurement sequence may include the surface control system 116 operating the ODEMLT 142 to cause the ODTx 150 to generate EM source signals 154 including broadband AC EM pulses centered at a frequency of about 35 MHz at a signal generation time, and to cause the ODRx 152 to sense EM return signals 156 (including signal reflections corresponding to the generated broadband AC EM pulses) across a 300 ns time window following the signal generation time.

In some embodiments, generating a saturation mapping of the reservoir based on the saturation data for the reservoir (block 306) includes generating a saturation mapping (or "radargram") for a horizontal section of a wellbore extending into a reservoir using the saturation data for the reservoir collected by way of saturation measurement sequences for the reservoir obtained using an ODEMLT. Continuing with the above example, using the saturation data 146 collected for saturation data 146 for the reservoir 102 and the wellbore 112 using the ODEMLT 142, the surface control system 116 can use the subset of saturation data 146 for each location of the locations of interest (e.g., the subsets of saturation data 146 for locations 0 m, 1 m, 2 m . . . and 48 m, respectively) to determine, for each location, signal velocities for the reservoir rock in the vicinity of the location, use the signal velocities determined to determine various electromagnetic properties (e.g., electrical conductivity ($\sigma$), magnetic permeability ($\mu$), and electric permittivity ($\epsilon$)) of the portion of the reservoir 102 below the location and the horizontal section 112b of the wellbore 112 as a function of distance from the location, and use the electromagnetic properties determined to determine saturation values of the portion of the reservoir 102 below the location and the horizontal section 112b of the wellbore 112 as a function of distance from the location. Further, the surface control system 116 can plot the determined saturation values for each of the locations to generate a two-dimensional radargram 148 that includes (or otherwise indicates) saturation values for a two-dimensional portion of the reservoir 102 located below the horizontal section 112b of the wellbore 112. In some embodiments, the surface control system 116 can use the saturation values to determine a profile of the oil-water contact boundary 128, and/or boundaries of the oil zone 120, the transition zone 122 and/or the water zone 124 below the horizontal section 112b of the wellbore 112. In such an embodiment, the radargram 148 can include a two-dimensional mapping (e.g., a visible line or other indication) of the profile of the oil-water contact boundary 128, and/or boundaries of the oil zone 120, the transition zone 122 and/or the water zone 124 below the horizontal section 112b of the wellbore 112. As described, in some embodiments, the resulting radargram 148 is used to as a basis for planning and conducting well operations to inhibit water cresting to the wellbore 112 of the well 110. For example, if the water cresting 126 is identified in the radargram 148, a well operator can conduct well operations to inhibit the water cresting 126.

In some embodiments, processing of the acquired saturation data 146 can include various combinations of processing to generate a corresponding radargram 148. For example, Dewow processing may be applied to each subset (or "trace") of the saturation data 146 for a location, independently. The Dewow processing can include calculating a mean value for a running window and subtracting that value from a central point. Such Dewow processing can provide for eliminating low frequency components in the saturation data 146. Static correction processing can be applied to each subset of the saturation data 146 for a location, independently, to shift the traces to positive or negative times. Such static correction processing can be applied to each subset of the saturation data 146 for a location eliminate time delays or trigger errors of data acquisition for the location. Gain can be applied to the saturation data 146 to emphasize low amplitude ranges against high amplitude ranges. Background noise removal can be applied to the saturation data 146 to eliminate consistently present noise. Bandpass frequency filtering can be applied to the saturation data 146 to eliminate certain ranged of frequencies from the data. Embodiments can include application of any combination of the above described processing techniques.

In some embodiments, the saturation mapping is be based on previously acquired saturation data 146 and/or corresponding radargrams 148. For example, the saturation mapping generated can include a time-lapse saturation mapping (or "time-lapse radargram") that further emphasizes changes in saturation of a reservoir 102 based on comparisons with radargrams 148 corresponding to earlier points in time. Such a time-lapse saturation mapping can provide an easy to decipher representation of the migration of water in a reservoir 102, including migration and/or cresting of a water zone and/or the oil-water contact boundary. Continuing with the above example, a saturation mapping operation may be conducted at day 1 to generate a first (or "baseline") radargram 148 of the 48 m horizontal section 112b of the wellbore 112, and subsequent saturation mapping operations may be conducted at each of day 7, day 14, day 21 and day 28 to generate respective second, third, fourth and fifth "weekly" radargrams 148 of the same 48 m horizontal section 112b of the wellbore 112. In such an embodiment, generating a saturation mapping of the reservoir based on the saturation data for the reservoir can include generating a time-lapse radargram 149 that includes some or all of the first, second, third, fourth and fifth weekly radargrams 148. The radargrams 148 of the time-lapse radargram 149 can be displayed and viewed in sequence (e.g., by a well operator), to identify if and how water is migrating within the reservoir 102, including migration and/or cresting of the water zone 124 and/or the oil-water contact boundary 128. In some embodiments, a radargram is subtracted from subsequent radargrams to remove noise and emphasize the changes in saturation relative to the baseline, over time. Continuing with the above example, generation of the first, second, third, fourth and fifth weekly radargrams 148 can include subtracting the first ("baseline") radargram 148 from each of the second, third, fourth and fifth weekly radargrams 148, respectively. Advantages of such a subtraction technique are illustrated and described with regard to at least FIG. 2A-2D.

In some embodiments, determining water migration within the reservoir based on the saturation mapping (block 308) includes assessing a saturation mapping for a reservoir to identify any "crests" or "cones" in an oil-water contact boundary, a transition zone, and/or a water zone encroaching on an oil zone or a wellbore, that is indicative of water cresting toward the wellbore. Referring to FIGS. 2A, 2B and 2C, determining water migration within the reservoir based on the saturation mapping can include identifying a water cresting event base on any of the readily apparent upward-arc features (or "crest" or "cone" features) 200a, 200c and/or 200d of the respective radargrams 148a, 148c and 148d. In some embodiments, the water crest event may be determined by the surface control system 116 based on the "height" of the upward-arc feature exceeding a height threshold. For example, if the oil-water contact boundary 128, an upper boundary of the water zone 124 and/or an upper boundary of the transition zone 122 directly below the 48 m horizontal section 112b of the wellbore 112 have a median distance from the center of the wellbore of about 15 m, and an upward-arc feature of the radargram 148 for the portion of the reservoir 102 below the 48 m horizontal section 112b of the wellbore 112 indicates that the oil-water contact boundary 128, an upper boundary of the water zone 124 and/or an upper boundary of the transition zone 122 directly below the 48 m horizontal section 112b of the wellbore 112 has an apex having a distance that is significantly closer to the center of the wellbore 122 than the median distance of about 15 m (e.g., about 1.5 m or more closer, or about 10% closer than the median distance, that is the apex of the upward-arc feature is at a distance of about 13.5 m or less), then the surface control system 116 may determine that a water crest event (e.g., water crest 126) is present. The difference in the median distance and the apex distance may be referred to as the "height" of a water crest.

For example, if the median distance for a boundary is about 15 m and the apex of an upward-arc feature of the boundary is at about 13 m, the corresponding water crest 126 may be said to have a water crest height of about 2.0 m. If the height threshold is set to 1.5 m, then the water crest 126 may be identified based on the height exceeding the threshold. In some embodiments, the generated radargram(s) are displayed to an operator for viewing. Continuing with the above example, the most recent radargram 148 (e.g., the fifth radargram 148) and/or several radargrams (e.g., a time-lapse radargram 149, including the first, send, third, fourth and fifth radargrams 148) may be displayed on a graphical display of the surface control system 116. A well operator may assess the displayed radargram(s) 148 to determine whether a water crest event is present. For example, the operator may determine that a water crest event is present based on an upward-arc feature of a substantial height (e.g., exceeding a height threshold of 1.5 m) being present in the displayed radargram(s) 148.

In some embodiments, conducting an operation to inhibit water cresting to the wellbore (block 310) includes planning, designing and/or conducting operations to inhibit water cresting to a horizontal section a wellbore. Continuing with the above example, conducting an operation to inhibit water cresting to the horizontal portion 112b of the wellbore 112 can include one or more of the following: the surface control system 116 throttling a production valve (e.g., at the surface) to reduce a rate of hydrocarbon production from the wellbore 112 (e.g., to increase the pressure of the hydrocarbons in the oil zone 124 to inhibit the migration of the water into the oil zone 124); the surface control system 116 throttling a valve in a portion of the wellbore 112 (e.g., at or near the identified crest 126) to reduce a rate of hydrocarbon production from the portion of the reservoir 102 between the crest 126 and the wellbore 112 (e.g., to increase the pressure of the hydrocarbons in the oil zone 124 between the crest 126 and the wellbore 112 to inhibit the migration of the water into the oil zone 124); the surface control system 116 modifying an ongoing injection operation (e.g., ceasing injection or otherwise reducing an injection rate) in the reservoir 102 (e.g., to reduce the pressure of the water in the water zone 124 to inhibit the migration of the water into the oil zone 124).

Figure 4:
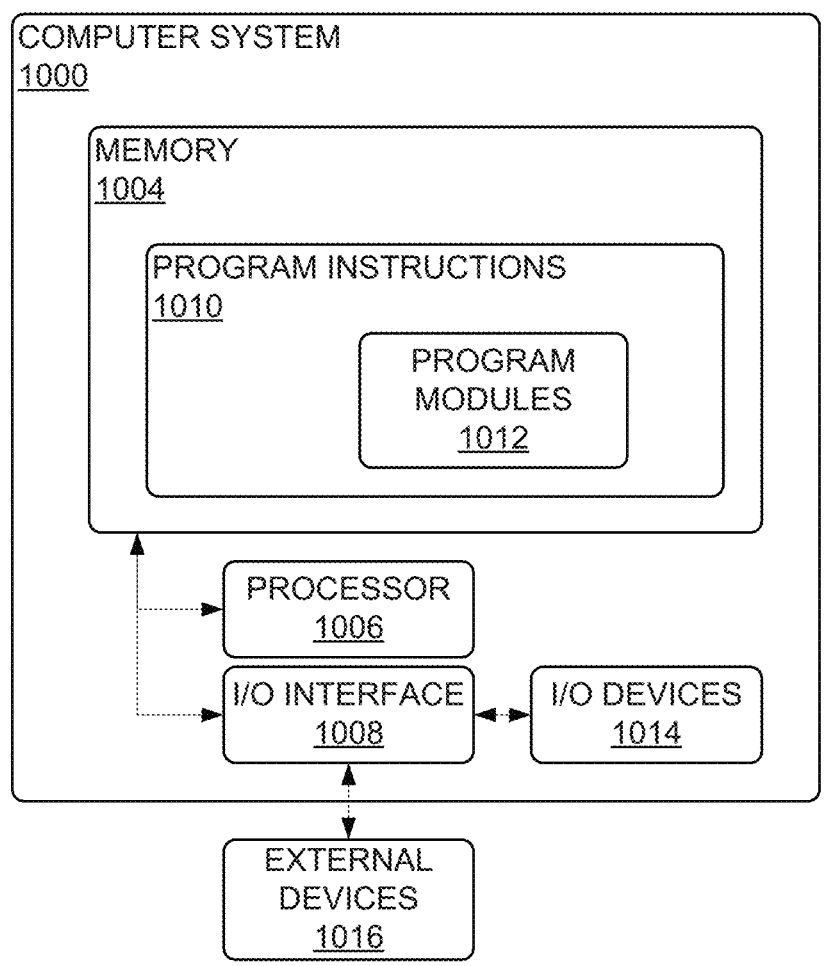
FIG. 4 is a diagram that illustrates an example computer system in accordance with one or more embodiments.

FIG. 4 is a diagram that illustrates an example computer system (or "system") 1000 in accordance with one or more embodiments. The illustrated system 1000 includes a memory 1004, a processor 1006 and an input/output (I/O) interface 1008. The memory 1004 may include one or more of non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), and bulk storage memory (e.g., CD-ROM or DVD-ROM, hard drives). The memory 1004 may include a non-transitory computer-readable storage medium having program instructions 1010 stored thereon. The program instructions 1010 can include program modules 1012 that are executable by a computer processor (e.g., the processor 1006) to cause the functional operations described, such as those described with regard to the surface control system 116.

The processor 1006 may be any suitable processor capable of executing program instructions. The processor 1006 may include a central processing unit (CPU) that carries out program instructions (e.g., the program instructions of the program module(s) 1012) to perform the arithmetical, logical, and input/output operations described. The processor 1006 may include one or more processors. The I/O interface 1008 may provide an interface for communication with one or more I/O devices 1014, such as sensors, a computer mouse, a keyboard, speakers and a display screen (e.g., an electronic display for displaying a graphical user interface (GUI)). The I/O devices 1014 may be connected to the I/O interface 1008 via a wired connection (e.g., Industrial Ethernet connection) or a wireless connection (e.g., a Wi-Fi connection). The I/O interface 1008 may provide an interface for communication with one or more external devices 1016, such as other computers and networks. In some embodiments, the I/O interface 1008 includes one or both of an antenna and a transceiver. In some embodiments, the external devices 1016 include one or more of the ODEMLT 142, sensors (e.g., surface or downhole temperature sensors, pressure sensors, and flowrate sensors), valves, pumps, and/or the like.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

It will be appreciated that the processes and methods described herein are example embodiments of processes and methods that may be employed in accordance with the techniques described herein. The processes and methods may be modified to facilitate variations of their implementation and use. The order of the processes and methods and the operations provided therein may be changed, and various elements may be added, reordered, combined, omitted, and/or modified. Portions of the processes and methods may be implemented in software, hardware, or a combination thereof.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an" element may include a combination of two or more elements. As used throughout this application, the phrase "based on" does not limit the associated operation to being solely based on a particular item. Thus, for example, processing "based on" data A may include processing based in part on data A and based in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method for monitoring water cresting in a subsurface formation, the method comprising:
    conducting a saturation data acquisition operation comprising, for each of a plurality of locations along a length of a horizontal section of a wellbore extending into a hydrocarbon reservoir of a subsurface formation:
        advancing an omnidirectional electromagnetic logging tool (ODEMLT) to the location, the ODEMLT comprising:
            an omnidirectional transmitter (ODTx) configured to transmit electromagnetic (EM) source signals comprising multi-frequency waveforms; and
            an omnidirectional receiver (ODRx) configured to sense EM return signals comprising reflections of the multi-frequency waveforms transmitted by the ODTx;
        operating the ODTx to transmit, into a portion of the subsurface formation below the horizontal section of the wellbore, an EM source signal comprising a multi-frequency waveform;
        operating the ODRx to sense an EM return signal comprising a reflection of the multi-frequency waveform from the subsurface formation; and
        generating a subset of saturation data for the location corresponding to the sensed EM return signal;
    generating, based on the subsets of saturation data for the plurality of locations along the length of the horizontal section of the wellbore, a radargram comprising a two-dimensional mapping of water saturation within a portion of the subsurface formation below the length of the horizontal section of the wellbore;
    conducting, at a first time, a first saturation data acquisition operation comprising, for each of the plurality of locations along the length of the horizontal section of the wellbore extending into the hydrocarbon reservoir of the subsurface formation:
        advancing the ODEMLT to the location;
        operating the ODTx to transmit, into the portion of the subsurface formation below the horizontal section of the wellbore, a first EM source signal comprising a first multi-frequency waveform;
        operating the ODRx to sense a first EM return signal comprising a reflection of the first multi-frequency waveform from the subsurface formation; and
        generating a first subset of saturation data for the location corresponding to the first EM return signal sensed;
    generating, based on the first subsets of saturation data for the plurality of locations along the length of the horizontal section of the wellbore, a first radargram comprising a two-dimensional mapping of water saturation within the portion of the subsurface formation below the length of the horizontal section of the wellbore at the first time, wherein the saturation data acquisition operation is conducted at a second time that is subsequent to the first time, wherein the radargram is an enhanced radargram, and wherein generating the enhanced radargram comprises subtracting the first radargram from the radargram generated based on the subsets of saturation data for the plurality of locations along the length of the horizontal section of the wellbore;

conducting, at a third time that is subsequent to the second time, a third saturation data acquisition operation comprising, for each of the plurality of locations along the length of the horizontal section of the wellbore extending into the hydrocarbon reservoir of the subsurface formation:

advancing the ODEMLT to the location;

operating the ODTx to transmit, into the portion of the subsurface formation below the horizontal section of the wellbore, a second EM source signal comprising a second multi-frequency waveform;

operating the ODRx to sense a second EM return signal comprising a reflection of the second multi-frequency waveform from the subsurface formation; and generating a third subset of saturation data for the location corresponding to the second EM return signal sensed; and generating, based on the third subsets of saturation data for the plurality of locations along the length of the horizontal section of the wellbore, a third radargram comprising a two-dimensional mapping of water saturation within a portion of the subsurface formation below the length of the horizontal section of the wellbore at the third time, wherein the third radargram is a second enhanced radargram, and wherein generating the second enhanced radargram comprises subtracting the first radargram from the radargram generated based on the third subsets of saturation data for the plurality of locations along the length of the horizontal section of the wellbore.

2. The method of claim 1, further comprising generating a time-lapse radargram comprising the radargram and the first radargram.

3. The method of claim 1, further comprising generating an enhanced time-lapse radargram comprising the enhanced radargram and the second enhanced radargram.

4. The method of claim 1, wherein the ODTx comprises a first omnidirectional antenna and the ODRx comprises one or more second omnidirectional antennas.

5. The method of claim 1, wherein the saturation data acquisition operation for each of the locations comprises the ODTx and the ODRx remaining stationary in a given orientation at the location.

6. The method of claim 1, wherein the radargram comprises an upward-arc feature corresponding to the water crest, and wherein identifying the water crest comprises identifying a height of the upward-arc feature exceeding a height threshold.

7. The method of claim 1, further comprising:

identifying, based on the radargram, a water crest comprising a cresting of water toward the horizontal section of the wellbore; and in response to identifying the water crest, conducting an operation to inhibit migration of the water crest toward the horizontal section of the wellbore.

8. The method of claim 7, wherein the operation to inhibit migration of the water crest toward the horizontal section of the wellbore comprises one or more of the following:

modifying a production rate of the well to inhibit migration of the water crest toward the horizontal section of the wellbore; and modifying a rate of water injection into the reservoir to inhibit migration of the water crest toward the horizontal section of the wellbore.

9. A system for monitoring water cresting in a subsurface formation, the system comprising:

an omnidirectional electromagnetic logging tool (ODEMLT), comprising:

an omnidirectional transmitter (ODTx) configured to transmit electromagnetic (EM) source signals comprising multi-frequency waveforms; and an omnidirectional receiver (ODRx) configured to sense EM return signals comprising reflections of the multi-frequency waveforms transmitted by the ODTx; and a well surface system configured to perform the following operations:

for each of a plurality of locations along a length of a horizontal section of a wellbore extending into a hydrocarbon reservoir of a subsurface formation:

advancing the ODEMLT to the location;

operating the ODTx to transmit, into a portion of the subsurface formation below the horizontal section of the wellbore, an EM source signal comprising a multi-frequency waveform;

operating the ODRx to sense an EM return signal comprising a reflection of the multi-frequency waveform from the subsurface formation; and generating a subset of saturation data for the location corresponding to the sensed EM return signal;

generating, based on the subsets of saturation data for the plurality of locations along the length of the horizontal section of the wellbore, a radargram comprising a two-dimensional mapping of water saturation within a portion of the subsurface formation below the length of the horizontal section of the wellbore;

conducting, at a first time, a first saturation data acquisition operation comprising, for each of the plurality of locations along the length of the horizontal section of the wellbore extending into the hydrocarbon reservoir of the subsurface formation:

advancing the ODEMLT to the location;

operating the ODTx to transmit, into the portion of the subsurface formation below the horizontal section of the wellbore, a first EM source signal comprising a first multi-frequency waveform;

operating the ODRx to sense a first EM return signal comprising a reflection of the first multi-frequency waveform from the subsurface formation; and generating a first subset of saturation data for the location corresponding to the first EM return signal sensed;

generating, based on the first subsets of saturation data for the plurality of locations along the length of the horizontal section of the wellbore, a first radargram comprising a two-dimensional mapping of water saturation within the portion of the subsurface formation below the length of the horizontal section of the wellbore at the first time,
wherein the saturation data acquisition operation is conducted at a second time that is subsequent to the first time, wherein the radargram is an enhanced radargram, and wherein generating the enhanced radargram comprises subtracting the first radargram from the radargram generated based on the subsets of saturation data for the plurality of locations along the length of the horizontal section of the wellbore;
conducting, at a third time that is subsequent to the second time, a third saturation data acquisition operation comprising, for each of the plurality of locations along the length of the horizontal section of the wellbore extending into the hydrocarbon reservoir of the subsurface formation:
advancing the ODEMLT to the location;
operating the ODTx to transmit, into the portion of the subsurface formation below the horizontal section of the wellbore, a second EM source signal comprising a second multi-frequency waveform;
operating the ODRx to sense a second EM return signal comprising a reflection of the second multi-frequency waveform from the subsurface formation;
generating a third subset of saturation data for the location corresponding to the second EM return signal sensed; and
generating, based on the third subsets of saturation data for the plurality of locations along the length of the horizontal section of the wellbore, a third radargram comprising a two-dimensional mapping of water saturation within a portion of the subsurface formation below the length of the horizontal section of the wellbore at the third time,
wherein the third radargram is a second enhanced radargram, and wherein generating the second enhanced radargram comprises subtracting the first radargram from the radargram generated based on the third subsets of saturation data for the plurality of locations along the length of the horizontal section of the wellbore.

10. The system of claim 9, wherein the operations further comprise:
generating a time-lapse radargram comprising the radargram and the first radargram.

11. The system of claim 9, wherein the operations further comprise:
generating an enhanced time-lapse radargram comprising the enhanced radargram and the second enhanced radargram.

12. The system of claim 9, wherein the ODTx comprises a first omnidirectional antenna and the ODRx comprises one or more second omnidirectional antennas.

13. The system of claim 9, wherein the saturation data acquisition operation for each of the locations comprises the ODTx and the ODRx remaining stationary in a given orientation at the location.

14. The system of claim 9, wherein the radargram comprises an upward-arc feature corresponding to the water crest, and wherein identifying the water crest comprises identifying a height of the upward-arc feature exceeding a height threshold.

15. The system of claim 9, wherein the operations further comprise:

identifying, based on the radargram, a water crest comprising a cresting of water toward the horizontal section of the wellbore; and
in response to identifying the water crest, conducting an operation to inhibit migration of the water crest toward the horizontal section of the wellbore.

16. The system of claim 15, wherein the operation to inhibit migration of the water crest toward the horizontal section of the wellbore comprises one or more of the following:
modifying a production rate of the well to inhibit migration of the water crest toward the horizontal section of the wellbore; and
modifying a rate of water injection into the reservoir to inhibit migration of the water crest toward the horizontal section of the wellbore.

17. A non-transitory computer readable medium comprising program instructions stored thereon that are executable to perform the following operations for monitoring water cresting in a subsurface formation:
conducting a saturation data acquisition operation comprising, for each of a plurality of locations along a length of a horizontal section of a wellbore extending into a hydrocarbon reservoir of a subsurface formation:
advancing an omnidirectional electromagnetic logging tool (ODEMLT) to the location, the ODEMLT comprising:
an omnidirectional transmitter (ODTx) configured to transmit electromagnetic (EM) source signals comprising multi-frequency waveforms; and
an omnidirectional receiver (ODRx) configured to sense EM return signals comprising reflections of the multi-frequency waveforms transmitted by the ODTx;
operating the ODTx to transmit, into a portion of the subsurface formation below the horizontal section of the wellbore, an EM source signal comprising a multi-frequency waveform;
operating the ODRx to sense an EM return signal comprising a reflection of the multi-frequency waveform from the subsurface formation; and
generating a subset of saturation data for the location corresponding to the sensed EM return signal;
generating, based on the subsets of saturation data for the plurality of locations along the length of the horizontal section of the wellbore, a radargram comprising a two-dimensional mapping of water saturation within a portion of the subsurface formation below the length of the horizontal section of the wellbore;
conducting, at a first time, a first saturation data acquisition operation comprising, for each of the plurality of locations along the length of the horizontal section of the wellbore extending into the hydrocarbon reservoir of the subsurface formation:
advancing the ODEMLT to the location;
operating the ODTx to transmit, into the portion of the subsurface formation below the horizontal section of the wellbore, a first EM source signal comprising a first multi-frequency waveform;
operating the ODRx to sense a first EM return signal comprising a reflection of the first multi-frequency waveform from the subsurface formation; and
generating a first subset of saturation data for the location corresponding to the first EM return signal sensed;
generating, based on the first subsets of saturation data for the plurality of locations along the length of the horizontal section of the wellbore, a first radargram comprising a two-dimensional mapping of water saturation within the portion of the subsurface formation below the length of the horizontal section of the wellbore at the first time, wherein the saturation data acquisition operation is conducted at a second time that is subsequent to the first time, wherein the radargram is an enhanced radargram, and wherein generating the enhanced radargram comprises subtracting the first radargram from the radargram generated based on the subsets of saturation data for the plurality of locations along the length of the horizontal section of the wellbore;

conducting, at a third time that is subsequent to the second time, a third saturation data acquisition operation comprising, for each of the plurality of locations along the length of the horizontal section of the wellbore extending into the hydrocarbon reservoir of the subsurface formation:

advancing the ODEMLT to the location;

operating the ODTx to transmit, into the portion of the subsurface formation below the horizontal section of the wellbore, a second EM source signal comprising a second multi-frequency waveform;

operating the ODRx to sense a second EM return signal comprising a reflection of the second multi-frequency waveform from the subsurface formation; and generating a third subset of saturation data for the location corresponding to the second EM return signal sensed; and generating, based on the third subsets of saturation data for the plurality of locations along the length of the horizontal section of the wellbore, a third radargram comprising a two-dimensional mapping of water saturation within a portion of the subsurface formation below the length of the horizontal section of the wellbore at the third time, wherein the third radargram is a second enhanced radargram, and wherein generating the second enhanced radargram comprises subtracting the first radargram from the radargram generated based on the third subsets of saturation data for the plurality of locations along the length of the horizontal section of the wellbore.

* * * * *